(12) United States Patent
Cha et al.

(10) Patent No.: US 12,083,489 B2
(45) Date of Patent: Sep. 10, 2024

(54) LED MIXER USING VIBRATORY BOWL FEEDER

(71) Applicant: SEOUL VIOSYS CO., LTD., Gyeonggi-do (KR)

(72) Inventors: Namgoo Cha, Gyeonggi-do (KR); Sang Min Kim, Gyeonggi-do (KR); Seongchan Park, Gyeonggi-do (KR); Woogun Lee, Gyeonggi-do (KR)

(73) Assignee: SEOUL VIOSYS CO., LTD., Ansan-si (KR)

( * ) Notice: Subject to any disclaimer, the term of this patent is extended or adjusted under 35 U.S.C. 154(b) by 239 days.

(21) Appl. No.: 17/340,929

(22) Filed: Jun. 7, 2021

(65) Prior Publication Data
US 2021/0379546 A1  Dec. 9, 2021

Related U.S. Application Data

(60) Provisional application No. 63/189,976, filed on May 18, 2021, provisional application No. 63/036,697, filed on Jun. 9, 2020.

(51) Int. Cl.
*B01F 35/71* (2022.01)
*B01F 31/00* (2022.01)
*B01F 31/60* (2022.01)

(52) U.S. Cl.
CPC ............ *B01F 35/716* (2022.01); *B01F 31/60* (2022.01); *B01F 31/70* (2022.01)

(58) Field of Classification Search
CPC ........ B01F 35/716; B01F 31/60; B01F 31/70; B01F 23/60; B01F 23/62; B01F 23/64; B01F 23/69; B65G 47/1421; B65G 27/34; B65G 27/02
See application file for complete search history.

(56) References Cited

U.S. PATENT DOCUMENTS

| | | | | |
|---|---|---|---|---|
| 3,194,392 A | * | 7/1965 | Manderbach | H05K 13/021 414/415 |
| 3,960,237 A | * | 6/1976 | Sleeper | B65G 27/02 181/200 |
| 4,163,643 A | * | 8/1979 | Hunter | G01N 35/04 422/65 |
| 5,269,440 A | * | 12/1993 | Bohnert | B65G 47/1421 198/380 |

(Continued)

FOREIGN PATENT DOCUMENTS

| | | | |
|---|---|---|---|
| CN | 204358652 U | * | 5/2015 |
| JP | H024489 A | * | 1/1990 |

(Continued)

OTHER PUBLICATIONS

International Search Report for International Application No. PCT/KR2021/007169, mailed Sep. 27, 2021, 2 pages.

*Primary Examiner* — Marc C Howell
*Assistant Examiner* — Patrick M McCarty
(74) *Attorney, Agent, or Firm* — Perkins Coie LLP

(57) ABSTRACT

A light emitting device mixer includes at least two bowl feeders, each including a bowl capable of holding workpieces, and a driving unit capable of causing vibration to the bowl. The bowl feeders include a moving passage through which the workpieces may move from one bowl feeder to an adjacent bowl feeder.

18 Claims, 7 Drawing Sheets

(56) References Cited

U.S. PATENT DOCUMENTS

| | | | | |
|---|---|---|---|---|
| 5,526,917 A | * | 6/1996 | Homma | B65G 27/34 |
| | | | | 198/444 |
| 5,656,325 A | * | 8/1997 | Wallace | B05C 19/06 |
| | | | | 427/195 |
| 2005/0098410 A1 | * | 5/2005 | Biancoli | A61J 3/074 |
| | | | | 198/757 |
| 2005/0115806 A1 | * | 6/2005 | Super | B65G 27/08 |
| | | | | 198/757 |
| 2008/0083597 A1 | * | 4/2008 | Kato | B65G 27/34 |
| | | | | 198/631.1 |
| 2009/0114665 A1 | * | 5/2009 | Ogawa | B65G 27/02 |
| | | | | 221/200 |
| 2012/0036711 A1 | | 2/2012 | Ban et al. | |
| 2020/0057367 A1 | * | 2/2020 | Cheng | B08B 3/04 |

FOREIGN PATENT DOCUMENTS

| | | | | |
|---|---|---|---|---|
| JP | H09253362 A | * | 9/1997 | |
| JP | 2007223738 A | | 9/2007 | |
| JP | 2012084718 A | * | 4/2012 | |
| JP | 2013163571 A | * | 8/2013 | |
| JP | 2018020892 A | * | 2/2018 | ............ B65G 27/02 |
| JP | 2018131314 A | | 8/2018 | |
| JP | 2019001626 A | | 1/2019 | |
| KR | 1020120134380 A | | 12/2012 | |

* cited by examiner

LED MIXER USING VIBRATORY BOWL FEEDER

CROSS-REFERENCE OF RELATED APPLICATIONS AND PRIORITY

The Present Application is a Non-provisional Application which claims priority to and benefit of the filing dates of U.S. Provisional Application Nos. 63/036,697 filed Jun 9, 2020 and 63/189,976 filed May 18, 2021, the disclosure of which are incorporated by reference herein in their entirety.

TECHNICAL FIELD

Exemplary embodiments relate to an LED mixer, and more particularly, to a mixer of LEDs for a display using a vibratory bowl feeder.

BACKGROUND

Recently, displays using ultra-small light emitting devices such as mini LEDs and micro LEDs have been developed. The mini LED is replacing a conventional backlight light source, and the micro LED can directly implement an image using LEDs without using a liquid crystal.

In general, a display apparatus realizes various colors through mixture of blue, green and red light. In order to realize various images, the display apparatus includes a plurality of pixels, each of which includes sub-pixels corresponding to blue, green and red light, respectively, in which a color of a certain pixel is determined based on the colors of the sub-pixels so that images may be realized through combination of such pixels.

In order to manufacture the display apparatus, a process of transferring light emitting devices from a wafer on which ultra-small light emitting devices are fabricated to a circuit board is carried out. In general, ultra-small light emitting devices are singularized or divided on the wafer, and thereafter, transferred to a carrier substrate through the transferring process. The light emitting devices are arranged in a matrix shape on the carrier substrate, and the light emitting devices on the carrier substrate are finally transferred to the circuit board to manufacture the display apparatus.

However, the light emitting devices fabricated together on the same wafer exhibit various distributions in electrical and optical characteristics even in a case of favorable products. In particular, there may be differences in electrical and optical characteristics of light emitting devices depending on regions on the wafer. For example, light emitting devices fabricated in a central region of the wafer may have higher or lower luminance than those fabricated in a peripheral region of the wafer, and may emit light of a shorter or a longer wavelength. The light emitting devices singularized on the wafer may be transferred to the circuit board while maintaining a relative locational relationship in the wafer. Accordingly, when the display apparatus manufactured using the light emitting devices fabricated together on the same wafer, a higher luminance region and a lower luminance region may be formed, resulting in mura in a displayed image.

Therefore, it is necessary to manufacture a display apparatus by uniformly mixing light emitting devices having different luminance from one another.

SUMMARY

Exemplary embodiments provide a mixer capable of uniformly mixing light emitting devices (micro LEDs or mini LEDs) having different luminance from one another to prevent mura from occurring in a displayed image.

Exemplary embodiments provide a mixer capable of preventing damage to light emitting devices while mixing the light emitting devices.

A light emitting device mixer according to one or more exemplary embodiments includes at least two bowl feeders. Each bowl feeder includes a bowl capable of holding workpieces and a driving unit capable of causing vibration to the bowl. The bowl feeders include a passage through which the workpieces may move from one bowl feeder to an adjacent bowl feeder.

In at least one variant, the bowl may include a spiral guide surface disposed along an inner wall of the bowl and a circular staircase disposed in a center of the bowl.

At least one of the bowl feeders may be adjacent to at least two bowls, and the at least one bowl feeder may include a giving guide capable of delivering workpieces to at least one adjacent bowl and a receiving guide capable of receiving the workpieces from another bowl.

In another variant, the giving guide may include a transferring passage for transferring workpieces to a receiving guide of an adjacent bowl feeder.

In further another variant, the transferring passage may include a hole formed in a bottom of the giving guide. The hole may be inclined to allow workpieces to slide down.

In another variant, the bowl feeder may further include a dropping device mounted on the giving guide for capable of dropping workpieces to the outside.

In another variant, the receiving guide may include an entrance for receiving workpieces and moving the workpieces into the bowl. The entrance may include a groove formed in an inner sidewall of the receiving guide.

In another variant, each of the bowl feeders may further include a vibration sensor.

In another variant, the LED mixer may further include at least one ionizer for removing static electricity in the bowl.

In another variant, the ionizer may be disposed over the bowls. The bowl feeders may be connected to one another by the passages so that workpieces may circulate through the bowl feeders.

In another variant, each of the bowl feeders may include a giving guide and a receiving guide, in which the giving guide of one bowl feeder may deliver workpieces to the receiving guide of an adjacent bowl feeder.

In another variant, at least one of the bowl feeders may further include a dropping device capable of dropping workpieces to the outside of the bowls.

Furthermore, the at least one of the bowl feeders may be adjacent to at least two bowls, and the at least one bowl feeder may include a giving guide capable of delivering workpieces to at least one adjacent bowl and a receiving guide capable of receiving the workpieces from adjacent another bowl.

In another variant, the dropping device may be mounted on the giving guide.

In another variant, the workpieces may be micro LEDs or mini LEDs.

In another variant, the bowl feeders may be arranged in a circular shape.

In another variant, the workpieces may circulate in one direction via the bowl feeders.

An LED mixer includes at least two bowl feeders and a passage. Each bowl feeder includes a bowl that holds workpieces and a driving unit generating vibration that is to be transmitted to the bowl. The passage connects the at least two bowl feeders and the workpieces move from one bowl feeder to an adjacent bowl feeder through the passage. The workpieces are micro LEDs or mini LEDs.

In at least one variant, the bowl includes a spiral guide surface disposed along an inner wall of the bowl, and a circular staircase disposed in a center of the bowl.

In another variant, the bowl feeders further include a first bowl feeder, a second bowl feeder arranged to be adjacent to the first bowl feeder, and a third bowl feeder arranged to be adjacent to the second bowl feeder. The LED mixer further includes a giving guide of the second bowl feeder that is configured to deliver the workpieces to the third bowl feeder. The LED mixer further includes a receiving guide of the second bowl feeder configured to receive the workpieces from the first bowl feeder.

In further another variant, the giving guide of the second bowl feeder includes a transferring passage for transferring the workpieces to a receiving guide of the third bowl feeder.

In another variant, the transferring passage includes a hole formed in a bottom of the giving guide of the second bowl feeder, and the hole is inclined to allow the workpieces to slide down.

In another variant, an end portion of the giving guide of the second bowl feeder is disposed on a receiving guide of the third bowl feeder such that the workpieces is delivered to the third bowl feeder via the giving guide of the second bowl feeder.

In another variant, the second bowl feeder further includes a dropping device mounted on the giving guide of the second bowl feeder that drops workpieces to an outside of the second bowl feeder.

In another variant, the receiving guide of the second bowl feeder includes an entrance for receiving the workpieces and moving the workpieces into a bowl of the second bowl feeder.

In another variant, the entrance includes a groove formed in an inner sidewall of the receiving guide of the second bowl feeder.

In another variant, each of the bowl feeders further includes a vibration sensor.

In another variant, the LED mixer further includes at least one ionizer for removing moisture, static electricity, or both in the bowl and the ionizer is disposed over the bowl.

An LED mixer includes a first bowl feeder comprising a first giving guide and a first receiving guide and a second bowl feeder comprising a second giving guide and a second receiving guide. Each of the first bowl feeder and the second bowl feeder includes a bowl that holds workpieces and a driving unit that drives movement of the workpieces in the bowl. The LED mixer further includes a first passage that connects the first and the second bowl feeders so that the workpieces move from the first bowl feeder and the second bowl feeder, the first passage comprising the first giving guide and the second receiving guide.

In at least one variant, the LED mixer further includes a third bowl feeder including a third giving guide and a third receiving guide and a second passage that connects the third bowl feeder with the second bowl feeder. The second passage further includes the second giving guide and the third receiving guide.

In another variant, the LED mixer further includes one or more bowl feeders arranged between the first bowl feeder and the third bowl feeder and additional passages collectively connecting the first bowl feeder and the third bowl feeder. The first bowl feeder, the second bowl feeder, the third bowl feeder, and the one or more bowl feeders are connected such that the workpieces circulate through the bowl feeders.

In further another variant, the bowl of the first bowl feeder further includes a spiral guide surface disposed along an inner wall of the bowl, and a circular staircase disposed in a center of the bowl. The workpieces entered into the bowl of the first bowl feeder via the first receiving guide move along the spiral guide surface by vibration and further move along the circular staircase to the second receiving guide of the second bowl feeder.

A method for mixing LEDs includes (i) arranging a first bowl feeder comprising a first giving guide and a first receiving guide; (ii) arranging, adjacent to the first bowl feeder, a second bowl feeder comprising a second giving guide and a second receiving guide; and (iii) arranging, adjacent to the second bowl feeder, a third bowl feeder comprising a third giving guide and a third receiving guide. Each of the first bowl feeder, the second bowl feeder, and the third bowl feeder comprises a bowl that holds workpieces and a driving unit that drives movement of the workpieces in the bowl. The method further includes (iv) connecting the first and the second bowl feeders with a first passage having the first giving guide and the second receiving guide; (v) connecting the second and the third bowl feeders with a second passage having the second giving guide and the third receiving guide; (vi) moving the workpieces from the first bowl feeder to the second bowl feeder via the first passage; and (vii) moving the workpieces from the second bowl feeder to the third bowl feeder via the second passage.

In at least one variant, the LED mixing method further includes (viii) arranging one or more bowl feeders between the first bowl feeder and the third bowl feeder; (ix) connecting the first bowl feeder and the third bowl feeder with additional passages collectively; and (x) circulating the workpieces from the first bowl feeder, through the second bowl feeder, the third bowl feeder, and the one or more bowl feeders, back to the first bowl feeder.

In another variant, the LED mixing method further includes, within the bowl, arranging the workpieces in a circular staircase disposed in a center of the bowl, moving the workpieces gradually to an inner wall of the bowl by vibration, pushing outward, the workpieces entered a spiral guide surface formed in the inner wall of the bowl, by vibration, and moving the workpieces to a giving guide of each bowl feeder.

In another variant, the LED mixing method further includes, moving the workpieces from the first bowl feeder to the second bowl feeder further includes (i) transferring the workpieces moved to the first giving guide of the first bowl feeder via a sliding structure formed in the first giving guide; (ii) receiving the workpieces from the sliding structure at the second receiving guide; and (iii) moving the workpieces into the bowl of the second bowl feeder via an entrance of the second receiving guide.

In another variant, the LED mixing method further includes, upon completion of mixing, opening an exit formed in the first bowl feeder, and pulling the workpieces outward through the exit.

DETAILED DESCRIPTION OF EMBODIMENTS

Figure 1:
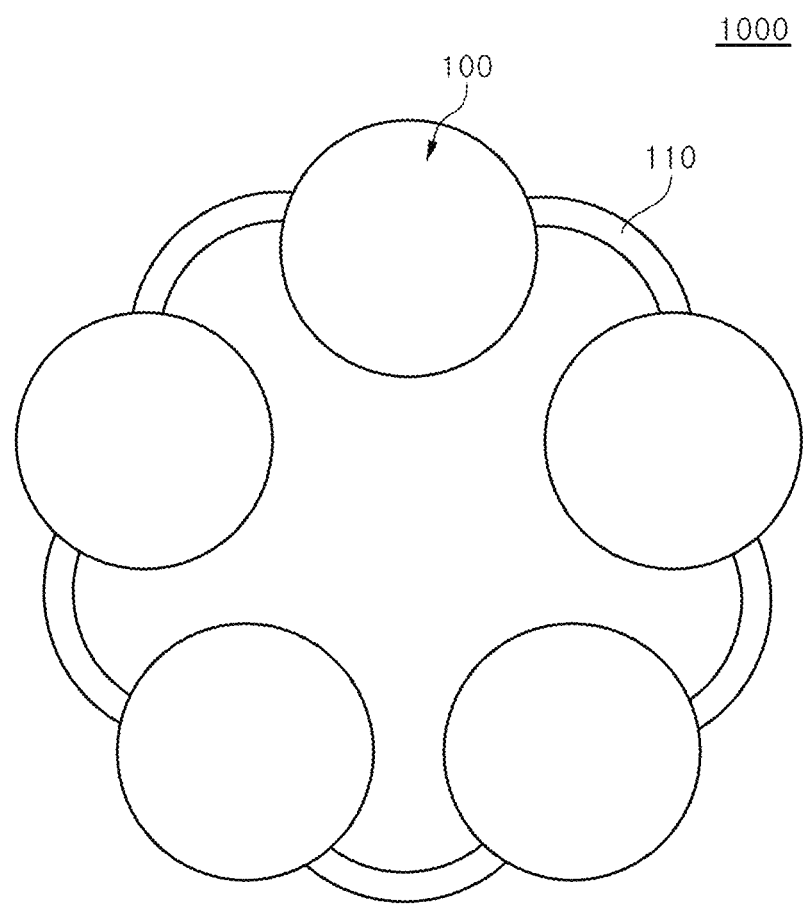
FIG. 1 is a schematic plan view illustrating an LED mixer according to an exemplary embodiment.

Hereinafter, embodiments will be described in detail with reference to the accompanying drawings. The following embodiments are provided by way of example so as to fully convey the spirit of the present disclosure to those skilled in the art to which the present disclosure pertains. Accordingly, the present disclosure is not limited to the embodiments disclosed herein and can also be implemented in different forms. In the drawings, widths, lengths, thicknesses, and the like of elements may be exaggerated for clarity and descriptive purposes. When an element or layer is referred to as being "disposed above" or "disposed on" another element or layer, it may be directly "disposed above" or "disposed on" the other element or layer or intervening elements or layers may be present. Throughout the specification, like reference numerals denote like elements having the same or similar functions.

Hereinafter, exemplary embodiments will be described in detail with reference to the accompanying drawings.

Hereinafter, a term, light emitting device refers to, for example, a micro LED or a mini LED that is a unit element arranged to manufacture a display apparatus. This unit element may be a sub-pixel that emits light of a single color, or may be a pixel module in which a plurality of sub-pixels are modularized.

Since the micro LED or the mini LED is extremely small in size, the number used in a large-area display apparatus may be more than 1 million or more, further 10 million or more. It is necessary to secure 10 million normal LEDs based on 4K image quality. These LEDs are manufactured using a plurality of wafers. Even LEDs manufactured in one wafer according to predetermined specification may exhibit different electrical or optical characteristics from one another depending on their locations on the wafer, and further, LEDs manufactured in different wafers may have different characteristics from one another due to differences in manufacturing processes as well as differences in wafers. Accordingly, the present disclosure relates to and provides an LED mixer that mixes LEDs potentially having different characteristics from one another.

An LED mixer according to one or more embodiments of the present disclosure operates to mix pixels from different groups such that a pixel from a first group, a pixel from a second group, a pixel from a third group, etc. are mixed together and rearranged. In some forms, the LED mixer operates to mix a first pixel manufactured in a first wafer, a second pixel manufactured in a second wafer, a third pixel manufactured in a third wafer, and more, such that the first pixel, the second pixel, the third pixel, etc. are arranged side by side or different patterns. In some forms, pixels in the first wafer, pixels in the second wafer, pixels in the third wafer, and pixels in the $n^{th}$ wafer may have different electrical or optical characteristics even though such pixels in different wafers are manufactured based on the same manufacturing specifications. By mixing, with the LED mixer, pixels from different groups (e.g., different wafers) and rearranging and/or reorganizing such pixels, discrepancies and/or differences among the pixels in the same group or different groups can be avoided or significantly reduced.

Figure 2:
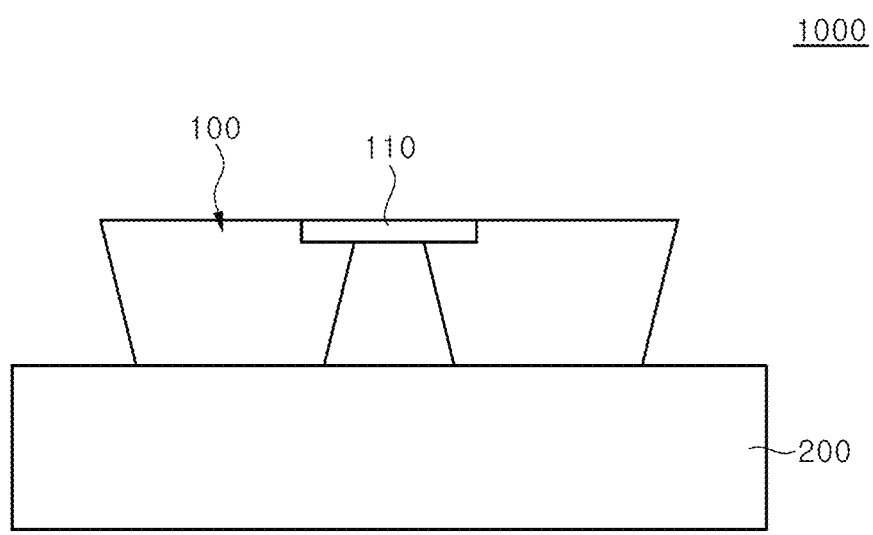
FIG. 2 is a schematic cross-sectional view illustrating the LED mixer according to an exemplary embodiment.

FIG. 1 is a schematic plan view illustrating an LED mixer 1000 according to an exemplary embodiment, and FIG. 2 is a schematic cross-sectional view illustrating the LED mixer according to an exemplary embodiment.

Referring to FIGS. 1 and 2, the LED mixer 1000 includes a plurality of bowl feeders 100 and passages 110. As shown in FIG. 2, the bowl feeders 100 may be disposed on a stage 200.

Figure 4:
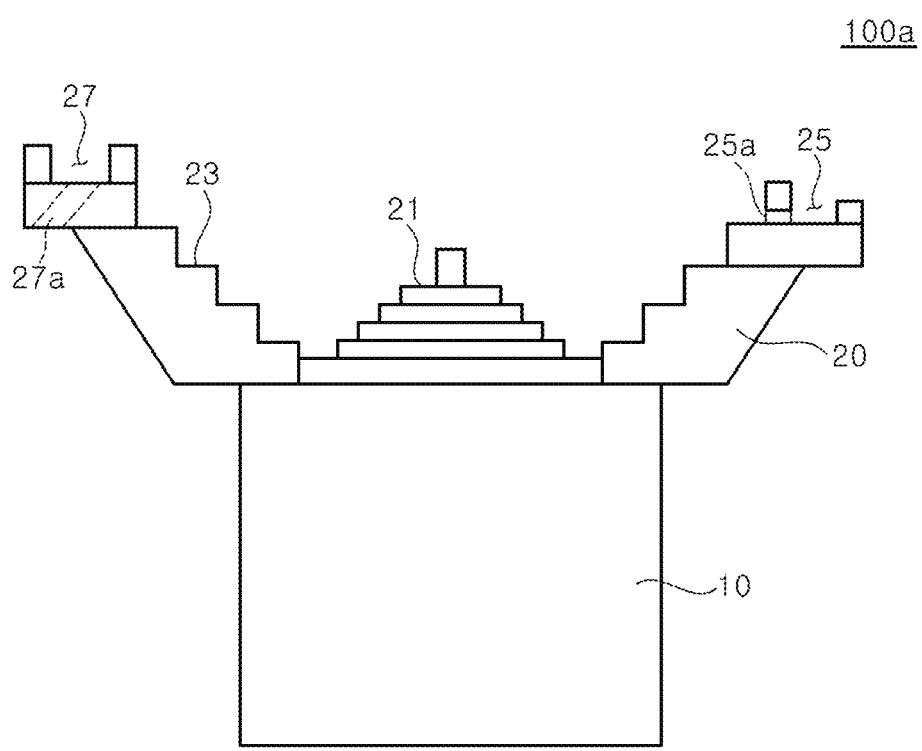
FIG. 4 is a schematic cross-sectional view of a bowl feeder in the LED mixer according to another exemplary embodiment.

The bowl feeder 100 generally includes a driving unit and a bowl disposed on the driving unit, as shown in FIG. 4, and workpieces such as micro LEDs and mini LEDs are disposed in the bowl. The workpieces are mixed with one another in the bowl by vibration of the driving unit.

As shown in FIG. 1, the bowls may be connected to one another by the passages 110. The workpieces may be pushed outward of the bowl by vibration of the driving unit, and may move from one bowl to another bowl adjacent thereto. As the plurality of bowls is connected to one another using the passages 110, it is possible to increase a moving path through which the workpieces move within the mixer 1000. Accordingly, it is possible to increase mixing effect of LEDs even in a small space. In addition, as many LEDs are mixed using the plurality of bowl feeders 100, damage to the LEDs may be prevented compared to when the LEDs are mixed using one bowl.

All of the LEDs to be mixed may be initially disposed in one bowl feeder 100 or may be disposed in several bowl feeders 100. By distributing LEDs in several bowl feeders 100, mixing time may be reduced. While the LEDs are mixed in the initially disposed bowl feeder 100, they may be mixed again by moving to an adjacent bowl feeder 100 through the passages 110. The LEDs may be pulled outward from any one of the bowl feeders 100 or from a plurality of bowl feeders.

In the illustrated exemplary embodiment, the bowl feeders 100 are connected to one another so that the LEDs may circulate. That is, the bowl feeders 100 are connected to one another through the passages 110. Moreover, the bowl feeders 100 may be arranged in a circular shape. However, in another exemplary embodiment, the bowl feeders 100 may be connected in a line, or one bowl feeder may be connected to two or more bowl feeders.

Figure 3:
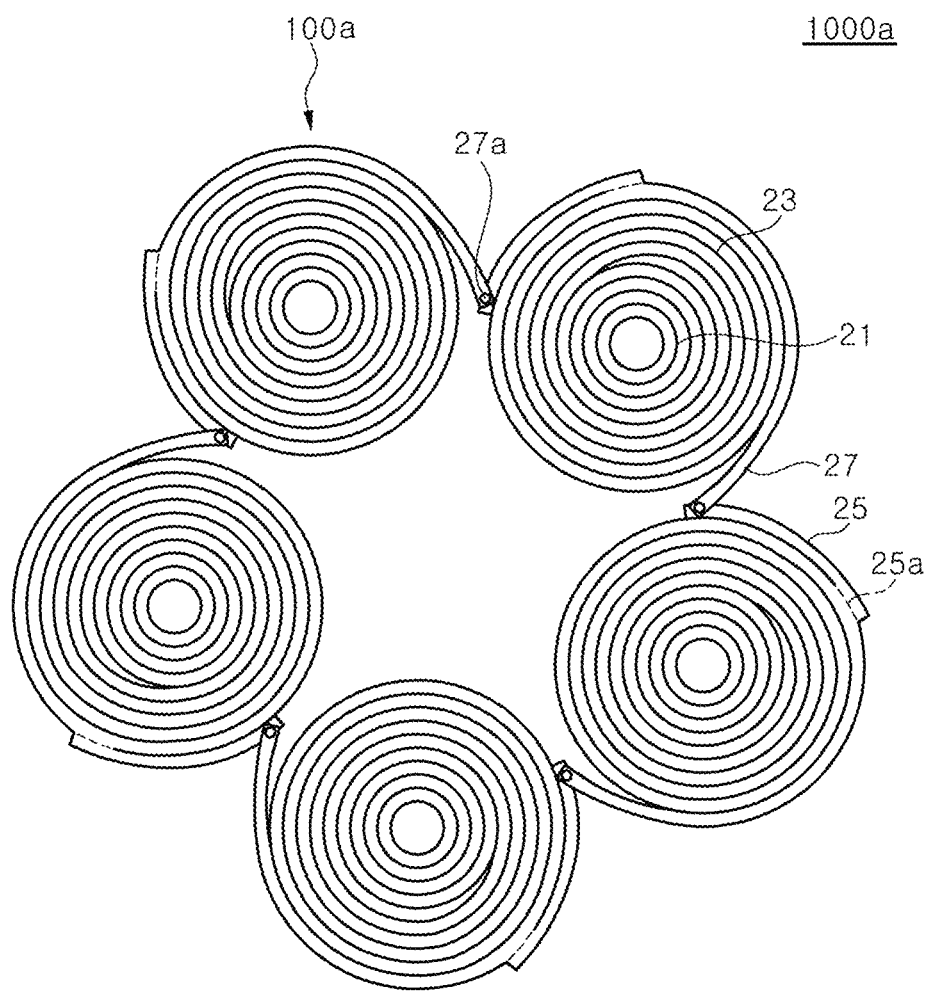
FIG. 3 is a schematic plan view illustrating an LED mixer according to another exemplary embodiment.
Figure 5:
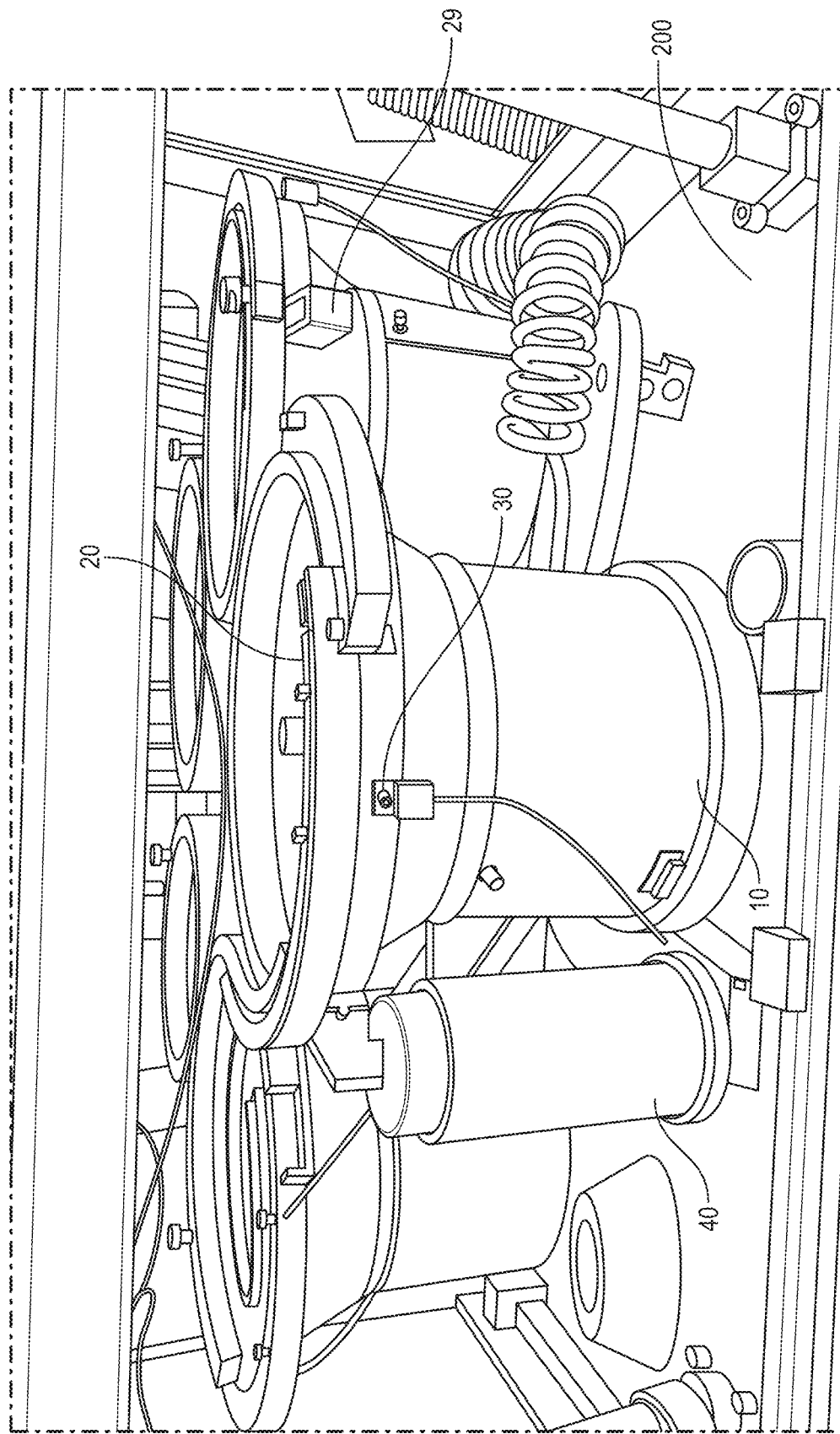
FIG. 5 is an image showing an LED mixer actually manufactured according to an exemplary embodiment.
Figure 6:
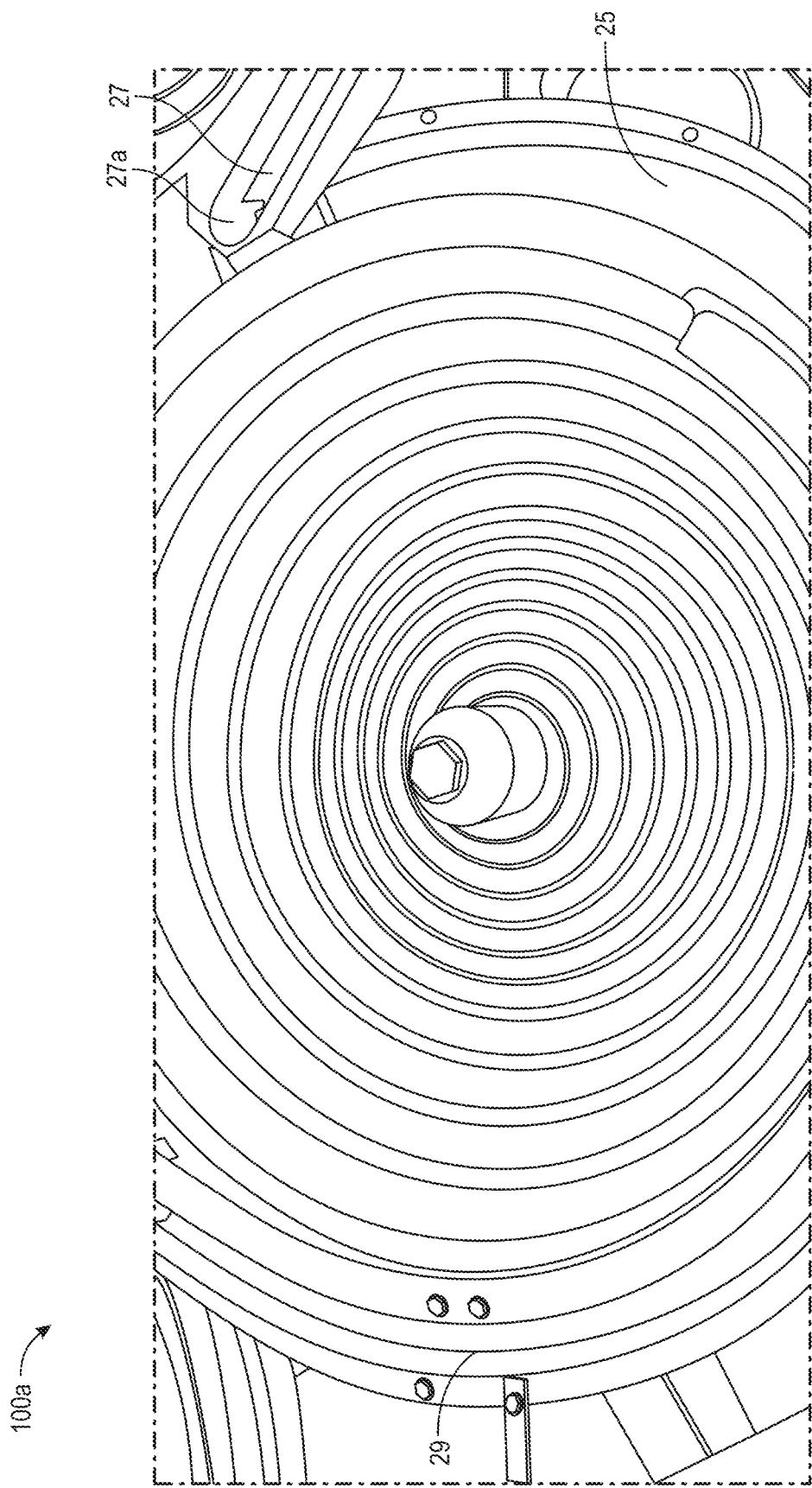
FIG. 6 is an image illustrating a bowl of the LED mixer actually manufactured according to an exemplary embodiment.

FIG. 3 is a schematic plan view illustrating an LED mixer according to another exemplary embodiment, and FIG. 4 is a schematic cross-sectional view of a bowl feeder in the LED mixer according to another exemplary embodiment. Meanwhile, FIG. 5 is an image showing an LED mixer actually manufactured according to an exemplary embodiment, and FIG. 6 is an image illustrating a bowl of the LED mixer actually manufactured according to an exemplary embodiment.

First, referring to FIGS. 3 and 4, a LED mixer 1000a includes a plurality of bowl feeders 100a, and each of the bowl feeders 100a includes a driving unit 10 (see FIG. 4) and a bowl 20.

The driving unit 10 may vibrate the bowl 20 using, for example, ultrasonic waves generated using a vibrator. The driving unit 10 may also include leaf springs, and vibration generated in the driving unit 10 may be transmitted to the bowl 20 by the leaf springs.

The bowl 20 defines an inner space capable of containing micro LEDs. A circular staircase 21 may be disposed in a center of the bowl 20. The circular staircase 21 allows workpieces disposed within the bowl 20, for example, micro LEDs or mini LEDs to gradually move to an inner wall of the bowl by vibration.

Meanwhile, the inner wall of the bowl 20 is formed of a spiral guide surface 23. The workpieces entering the spiral guide surface 23 are pushed outward by vibration and move to a giving guide 27 of the bowl 20 along the spiral guide surface 23.

Each of the bowls 20 may include a receiving guide 25 and the giving guide 27. The receiving guide 25 receives the workpieces from the giving guide 27 of an adjacent bowl 20, and the giving guide 27 delivers the workpieces to an adjacent bowl 20.

The receiving guide 25 may have a groove shape surrounded by an inner sidewall and an outer sidewall, and accordingly, the workpieces may not fall out of the bowl 20. The receiving guide 25 also includes an entrance 25a through which the workpieces may be introduced into the bowl 20. In an exemplary embodiment, as shown in FIG. 4, the entrance 25a may be a groove formed on the inner sidewall. However, the inventive concepts are not limited thereto, and various structures capable of introducing workpieces into the bowl 20 from the receiving guide 25 may be considered. For example, a passage leading to the inside of the bowl 20 may be formed on a bottom surface of the receiving guide 25, and further, the workpieces may slide down to a bottom surface of the bowl 20 through a sliding hole formed on the bottom surface of the receiving guide 25.

The giving guide 27 delivers, the workpieces that have been moved along the spiral guide surface 23 by vibration, to the receiving guide 25 of an adjacent bowl 20. As well shown in FIGS. 5 and 6, an end portion of the giving guide 27 may be disposed on the receiving guide 25 of the adjacent bowl 20. In some forms, the receiving guide 25 may be positioned lower than the giving guide 27 to facilitate movement of the workpieces from the giving guide 27 to the receiving guide 25 of the adjacent bowl. The giving guide 27 corresponds to a chute of each bowl feeder. The giving guide 27 includes a transferring passage 27a for moving workpieces to the receiving guide 25. The transferring passage 27a may include a hole formed in a bottom of the giving guide 27. Furthermore, the hole may be inclined so that the workpieces may slide down. By allowing the workpieces to slide down along the inclined surface of the hole, it is possible to prevent the workpieces from being damaged by impact. However, the transferring passage 27a is not limited to the hole. The transferring passage 27a may be designed in various structures, and may be, for example, a sliding surface formed at the end portion of the giving guide 27. Based on various structures and designs of the transferring passage 27a, the position and structures of the receiving guide 25 and the giving guide 27 of the bowl feeder 100a may be modified accordingly.

The bowl feeders 100a may be continuously connected to one another by the giving guide 27 and the receiving guide 25. The workpieces may circulate along the continuously connected bowl feeders 100a.

Meanwhile, the bowl feeder 100a may include an exit through which the workpieces may be pulled outward after the workpieces are sufficiently mixed. The exit may include, for example, a dropping device (see 29 in FIGS. 5 and 6) capable of dropping the workpieces down. The dropping device 29 may be mounted on the giving guide 27, for example. The dropping device 29 may include a portion of a bottom surface of the giving guide 27, and an exit, through which the workpieces may fall down on the bottom surface of the giving guide 27, may be provided by separating this portion from the giving guide 27. While the workpieces are mixed, the exit is closed, and thus, the workpieces may move along the giving guide 27.

As shown in FIG. 5, a container 40 capable of receiving the workpieces may be disposed under the dropping device 29. When the dropping device 29 is opened, the workpieces may move from the giving guide 27 to the container 40, and accordingly, the mixed workpieces may be moved to a next process.

The bowl feeder 100a may also include a vibration sensor 30 as shown in FIG. 5. The vibration sensor 30 may detect vibration caused by the driving unit 10.

Figure 7:
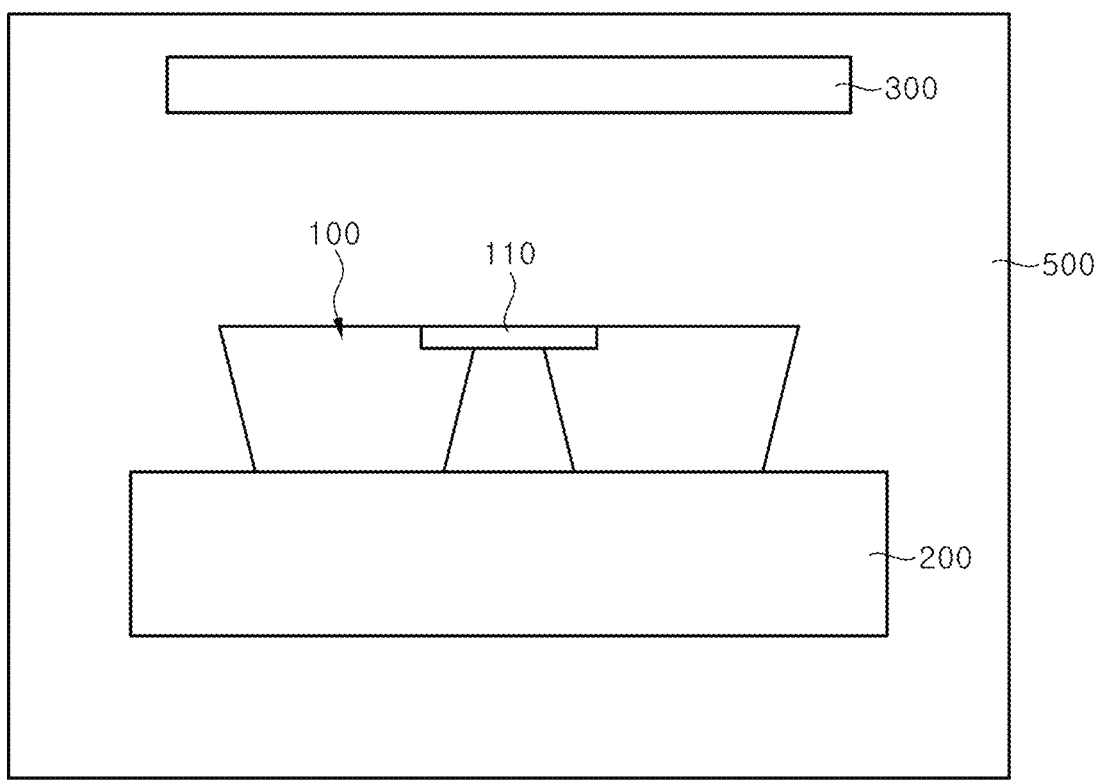
FIG. 7 is a schematic cross-sectional view illustrating an LED mixer including an ionizer.

FIG. 7 is a schematic cross-sectional view illustrating an LED mixer 1000b including an ionizer.

Referring to FIG. 7, the LED mixer 1000b according to the illustrated exemplary embodiment may further include an ionizer 300 and a chamber 500 in addition to the LED mixer 1000 or 1000a described above.

The ionizer 300 removes moisture or static electricity from the inside of a bowl 20 by generating ions. Moisture and static electricity prevent mixing of workpieces. For example, the workpieces may be agglomerated with one another by moisture and static electricity, or may stick to an inner wall of the bowl 20. The ionizer 300 removes moisture and static electricity to assist the workpieces to be well mixed.

The ionizer 300 may be disposed over a bowl feeder 100 to cover all of a plurality of bowl feeders 100. In another exemplary embodiment, the ionizer 300 may be disposed on each of the bowl feeders 100, respectively.

In the above exemplary embodiments, it has been described that the bowl feeders 100 and 100a are arranged in the circular shape and the workpieces may circulate along the bowl feeders 100 and 100a, but the inventive concepts are not limited thereto. The bowl feeders 100 and 100a may be connected in various ways. The bowl feeders 100 and 100a may be connected in, for example, a single chain including a first bowl feeder and a last bowl feeder, and furthermore, one bowl feeder may be connected to adjacent three or more bowl feeders.

According to the exemplary embodiments, as the workpieces are mixed using vibration, damage to the LEDs may be prevented compared to a case of mixing the workpieces through other physical methods. Furthermore, by connecting the plurality of bowl feeders, a moving distance of the workpieces may be maximized, and thus, mixing effect of the workpieces may be maximized.

The LEDs mixed for a certain period of time are put in a container 40 through a dropping device 29 and thereafter, move to an arrangement step. That is, the mixed LEDs are arranged on a carrier substrate. The mixed LEDs are put into a separate bowl feeder and may be discharged to a linear outlet through the bowl feeder. A camera disposed at an exit of the bowl feeder checks images of the LEDs, and the LEDs discharged in a desired state may be arranged on the carrier substrate using a pick and place. Meanwhile, the LEDs in which the images checked through the camera deviate from the desired state may be returned to the bowl feeder. Through this step, uniformly mixed LEDs may be arranged on the carrier substrate.

An electrical and optical characteristics test may be carried out on the LEDs arranged on the carrier substrate, and visual inspection may also be carried out on the LEDs. Thereafter, the LEDs on the carrier substrate may be transferred to a circuit board through a mass transferring process.

In addition, a protection film may be attached on the LEDs to protect the LEDs before being transferred to the circuit board.

Although some exemplary embodiments have been described herein, it should be understood that these exemplary embodiments are provided for illustration only and are not to be construed in any way as limiting the present disclosure. It should be understood that features or components of one exemplary embodiment can also be applied to other exemplary embodiments without departing from the spirit and scope of the present disclosure.

What is claimed is:

1. An LED mixer, comprising:
    a first bowl feeder including a first bowl that holds workpieces and a first driver generating vibration that is to be transmitted to the first bowl;
    a second bowl feeder including a second bowl and a second driver generating vibration that is to be transmitted to the second bowl; and
    a passage connecting the first bowl feeder and the second bowl feeder,
    wherein the workpieces move through the passage from the first bowl feeder to the second bowl feeder;
    wherein the workpieces are micro LEDs or mini LEDs, and
    wherein the second bowl feeder includes a delivery guide configured to deliver the workpieces to a third bowl feeder and a receipt guide configured to receive the workpieces from the first bowl feeder, the receipt guide located at a first side of the second bowl feeder and positioned lower than the delivery guide located at a second side opposite to the first side of the second bowl such that a distance between the receipt guide and the second driver in a vertical direction is shorter than a distance between the delivery guide and the second driver in the vertical direction.

2. The LED mixer of claim 1,
    wherein the second bowl comprises:
    a spiral guide surface disposed along an inner wall of the second bowl; and
    a circular staircase disposed in a center of the second bowl.

3. The LED mixer of claim 1,
    wherein an end portion of the delivery guide of the second bowl feeder is disposed on a receipt guide of the third bowl feeder such that the workpieces are delivered to the third bowl feeder via the delivery guide of the second bowl feeder.

4. The LED mixer of claim 1,
    wherein the second bowl feeder further includes a drop device mounted on the delivery guide of the second bowl feeder that drops workpieces to an outside of the second bowl feeder.

5. The LED mixer of claim 1,
    wherein each of the first bowl feeder and the second bowl feeder further includes a vibration sensor.

6. The LED mixer of claim 1, further comprising:
    at least one ionizer for removing moisture, static electricity, or both in the second bowl, and the at least one ionizer is disposed over the second bowl.

7. The LED mixer of claim 1,
    wherein the delivery guide of the second bowl feeder includes a transfer passage for transferring the workpieces to a receipt guide of the third bowl feeder.

8. The LED mixer of claim 7, wherein:
    the transfer passage includes a hole formed in a bottom of the delivery guide of the second bowl feeder; and
    the hole is inclined to allow the workpieces to slide down.

9. The LED mixer of claim 1,
    wherein the receipt guide of the second bowl feeder includes an entrance for receiving the workpieces and moving the workpieces into the second bowl of the second bowl feeder.

10. The LED mixer of claim 9,
    wherein the entrance includes a groove formed in an inner sidewall of the receipt guide of the second bowl feeder.

11. An LED mixer, comprising:
    a first bowl feeder comprising a first delivery guide, and a first receipt guide;
    a second bowl feeder comprising a second delivery guide, and a second receipt guide;
    a third bowl feeder including a third delivery guide and a third receipt guide;
    a second passage that connects the third bowl feeder with the second bowl feeder;
    wherein the first bowl feeder comprises a first bowl that holds workpieces and a first driver that drives movement of the workpieces in the first bowl; and
    a first passage that connects the first bowl feeder and the second bowl feeder so that the workpieces move from the first bowl feeder to the second bowl feeder, the first passage comprising the first delivery guide and the second receipt guide,
    wherein a distance between the first receipt guide located at a first side of the first bowl feeder and the first driver of the first bowl feeder in a vertical direction is shorter than a distance between the first delivery guide located at a second side opposite to the first side of the first bowl feeder and the first driver of the first bowl feeder in the vertical direction,
    wherein the second passage further comprises the second delivery guide and the third receipt guide.

12. The LED mixer of claim 11, further comprising:
    one or more bowl feeders arranged between the first bowl feeder and the third bowl feeder; and
    additional passages collectively connecting the first bowl feeder and the third bowl feeder;
    wherein the first bowl feeder, the second bowl feeder, the third bowl feeder, and the one or more bowl feeders are connected such that the workpieces circulate through the one or more bowl feeders.

13. The LED mixer of claim 11, wherein the first bowl of the first bowl feeder further comprises:
    a spiral guide surface disposed along an inner wall of the first bowl; and
    a circular staircase disposed in a center of the first bowl;
    wherein the workpieces entered into the first bowl of the first bowl feeder via the first receipt guide move along the circular staircase by vibration and further move along a spiral guide surface to the second receipt guide of the second bowl feeder.

14. A method for mixing LEDs, comprising:
    arranging a first bowl feeder comprising a first delivery guide and a first receipt guide positioned lower than the first delivery guide;
    arranging, adjacent to the first bowl feeder, a second bowl feeder comprising a second delivery guide and a second receipt guide positioned lower than the second delivery guide;
    arranging, adjacent to the second bowl feeder, a third bowl feeder comprising a third delivery guide and a third receipt guide, wherein the first bowl feeder comprises a first bowl that holds workpieces and a first driver that drives movement of the workpieces in the first bowl;

connecting the first bowl feeder and the second bowl feeder with a first passage including the first delivery guide and the second receipt guide;

connecting the second and the third bowl feeders with a second passage including the second delivery guide and the third receipt guide;

moving the workpieces from the first bowl feeder to the second bowl feeder via the first passage; and moving the workpieces from the second bowl feeder to the third bowl feeder via the second passage, and wherein a distance between the first receipt guide located at a first side of the first bowl feeder and the first driver of the first bowl feeder in a vertical direction is shorter than a distance between the first delivery guide located at a second side opposite to the first side of the first bowl feeder and the first driver of the first bowl feeder in the vertical direction.

15. The method for mixing LEDs of claim 14, further comprising:

arranging one or more bowl feeders between the first bowl feeder and the third bowl feeder;

connecting the first bowl feeder and the third bowl feeder with additional passages collectively; and circulating the workpieces from the first bowl feeder, through the second bowl feeder, the third bowl feeder, and the one or more bowl feeders, back to the first bowl feeder.

16. The method for mixing LEDs of claim 14, further comprising:

upon completion of mixing, opening an exit formed in the first bowl feeder; and pulling the workpieces outward through the exit.

17. The method for mixing LEDs of claim 14, further comprising:

within the first bowl:

arranging the workpieces in a circular staircase disposed in a center of the first bowl;

moving, by vibration, the workpieces gradually to an inner wall of the first bowl;

pushing, by vibration, outward, the workpieces entering a spiral guide surface formed in the inner wall of the first bowl; and moving the workpieces to the first delivery guide of the first bowl feeder.

18. The method for mixing LEDs of claim 17, wherein moving the workpieces from the first bowl feeder to the second bowl feeder further comprises:

transferring the workpieces moved to the first delivery guide of the first bowl feeder via a slide structure formed in the first delivery guide;

receiving the workpieces from the slide structure at the second receipt guide; and moving the workpieces into a second bowl of the second bowl feeder via an entrance of the second receipt guide.

* * * * *